United States Patent
Nilsson

(10) Patent No.: US 12,240,488 B2
(45) Date of Patent: Mar. 4, 2025

(54) METHOD AND SYSTEM FOR REDUCING LATENCY BETWEEN AN AUTOMATED VEHICLE AND A REMOTE TERMINAL

(71) Applicant: VOYSYS AB, Norrköping (SE)

(72) Inventor: Jonathan Nilsson, Norrköping (SE)

(73) Assignee: VOYSYS AB, Norrkoping (SE)

( * ) Notice: Subject to any disclaimer, the term of this patent is extended or adjusted under 35 U.S.C. 154(b) by 304 days.

(21) Appl. No.: 17/781,307

(22) PCT Filed: Dec. 3, 2020

(86) PCT No.: PCT/EP2020/084518
§ 371 (c)(1),
(2) Date: May 31, 2022

(87) PCT Pub. No.: WO2021/110863
PCT Pub. Date: Jun. 10, 2021

(65) Prior Publication Data
US 2022/0410928 A1    Dec. 29, 2022

(30) Foreign Application Priority Data
Dec. 5, 2019 (EP) .................................. 19213953

(51) Int. Cl.
*B60W 60/00* (2020.01)
*G07C 5/00* (2006.01)
(Continued)

(52) U.S. Cl.
CPC .......... *B60W 60/001* (2020.02); *G07C 5/008* (2013.01); *H04L 47/34* (2013.01); *H04L 67/12* (2013.01);
(Continued)

(58) Field of Classification Search
CPC ........ B60W 60/001; B60W 2554/4041; G07C 5/008; H04L 47/34; H04L 67/12;
(Continued)

(56) References Cited

U.S. PATENT DOCUMENTS 4,630,260 A * 12/1986 Toy .................... G06F 15/17393
                                                    370/388
2018/0270150 A1  9/2018  Gholmieh et al.
(Continued)

FOREIGN PATENT DOCUMENTS

EP          3185569 A1    6/2017

OTHER PUBLICATIONS

International Search Report and Written Opinion for co-pending PCT/EP2020/084518, 16 pages, Dec. 14, 2020.

*Primary Examiner* — Alan D Hutchinson
(74) *Attorney, Agent, or Firm* — Kagan Binder, PLLC

(57) ABSTRACT

The present invention relates to a method and system for communicating information between an automated vehicle (20) and a remote terminal (10), comprising providing (102) information (12, 22) to be communicated between the automated vehicle and the remote terminal, packaging (104) said information as a sequence (30) of N data packets (P), wherein each data packet is provided with a unique data packet number (6) ranging from 1 to N indicating the position of each data packet in the sequence of data packets, transmitting (106) the sequence of N data packets via at least a first (A) and a second (B) communications link between the automated vehicle and the remote terminal, assembling (108) a complete sequence of N unique data packets after each unique data packet has been successfully communicated via either said at least a first or a second communications link, wherein the sequence of N data packets is transmitted via said at least a first communications link in an order of ascending data packet numbers and via said at least
(Continued)

a second communications link in an order of descending data packet numbers.

16 Claims, 5 Drawing Sheets

(51) Int. Cl.
*H04L 45/24* (2022.01)
*H04L 47/34* (2022.01)
*H04L 67/12* (2022.01)

(52) U.S. Cl.
CPC ...... *B60W 2554/4041* (2020.02); *H04L 45/24* (2013.01)

(58) Field of Classification Search
CPC .... H04L 45/24; G05D 1/0022; G08G 1/0112; G08G 1/0137
See application file for complete search history.

(56) References Cited

U.S. PATENT DOCUMENTS

2019/0297534 A1   9/2019  Hwang et al.
2022/0410928 A1* 12/2022  Nilsson ................... H04L 47/34

* cited by examiner

METHOD AND SYSTEM FOR REDUCING LATENCY BETWEEN AN AUTOMATED VEHICLE AND A REMOTE TERMINAL

CROSS-REFERENCE TO RELATED APPLICATIONS

This application claims priority to International Application No. PCT/EP2020/084518, filed Dec. 3, 2020, which in turn claims priority from European Patent Application having serial number 19/213,953.3, filed on Dec. 5, 2019, both of which are incorporated herein by reference in their entireties for all purposes.

TECHNICAL FIELD

The present disclosure relates to a method and system for communicating information between an automated vehicle and a remote terminal and for reducing latency between said automated vehicle and remote terminal.

BACKGROUND

Automated vehicles are currently being investigated for improving traffic safety and for improving transportation. Automated vehicles may be categorized with respect to their autonomy, i.e. the level of required interaction by a user for operating various functions of the automated vehicles.

One particular category of automated vehicles is the remote-operated automated vehicle. In such automated vehicle systems, the automated vehicle captures sensory data and transmits the sensory data to a remote terminal for constructing a representation of the surrounding of the automated vehicle. Using the constructed representation, the automated vehicle may be instructed from the remote terminal with further driving instructions enabling it to navigate its surrounding. In order to realize such an automated vehicle system, two particular problems must be solved in a satisfactory manner: how to transmit such high quantities of information between the automated vehicle and the remote terminal without significant loss of information, and how to transmit such high quantities of information with low latency.

It has been identified that current solutions may be improved upon in order to solve these problems in a more satisfactory manner. Hence, there is a need for an improved remote-operated automated vehicle and method for remote operating an automated vehicle.

SUMMARY

It is an object of the present invention to provide an improved solution that alleviates the mentioned drawbacks with present solutions. Furthermore, it is an object to provide a method for communicating information between an automated vehicle and a remote control with low latency.

The invention is defined by the appended independent claims, with embodiments being set forth in the appended dependent claims, in the following description and in the drawings.

According to a first aspect of the invention, this is provided by a computer-implemented method for communicating information between an automated vehicle and a remote terminal, comprising the steps of providing information to be communicated between the automated vehicle and the remote terminal, packaging said information by means of a first packaging unit as a sequence of N data packets, wherein each data packet is provided with a unique data packet number ranging from 1 to N indicating the position of each data packet in the sequence of data packets, transmitting the sequence of N data packets via at least a first and a second communication link between the automated vehicle and the remote terminal, said at least a first and a second communication link established by means of an automated vehicle communication unit and a remote terminal communication unit, assembling a complete sequence of N unique data packets by means of an assembling unit after each unique data packet has been successfully communicated via either said at least a first or a second communication link, wherein the sequence of N data packets is transmitted via said at least a first communication link in an order of ascending data packet numbers and via said at least a second communication link in an order of descending data packet numbers.

The information to be communicated may be sent either from the automated vehicle or the remote terminal. The entity transmitting the sequence of data packets via the two communication links may provide or be provided with the information to be communicated, and may package the information into the sequence of N data packets. The other entity may receive the sequence of N data packets via the two communication links and assemble a complete sequence of data packets using the sequences sent via the two communication links. By sending the sequence via two communication links in reversed packet number orders, an efficient transmission with low losses and low latency may be provided. The assembling of the data packets into a complete sequence may be made using the data packets first received at either of the communication links. Thereby, not the complete sequence needs to be received over each communication link before a complete sequence of the communicated data packets can be assembled. Further, if a packet or frame in a packet is not received over one of the communication links due to an error, the corresponding packet with the same packet number received over the other of the communication links may be used. By transmitting the sequence of N data packets over both the first and the second communication link, it may be meant the entire sequence of N data packets is transmitted over both communication links.

The communication links may be over separate communication networks, or over different links or channels in a common communication network.

According to one embodiment, the unique data packet number may be provided in a header of each data packet. The data packet number of each data packet may start on 1 followed by 2, 3, . . . N in the sequence of data packets. When packaging the information in to a sequence of data packets, each data packet may be provided with the data packet number in the header. By unique it may be meant that each data packet in the sequence of data packets has a number that is unique relative the other data packets in the sequence.

According to one embodiment, the step of packaging the information in a sequence of N data packets may comprise a step of using a protocol defining a header comprising any combination of the following fields: protocol identifier, frame index, frame buffer, buffer offset, data payload. Each data packet may thereby be formed with a header. The header may comprise the unique data packet number.

According to one embodiment, at least one of the first and second communications link may be a wireless communication link established over a cellular network, such as 4G/LTE or 5G.

According to one embodiment, said provided information to be communicated may include sensory data of the surroundings of the automated vehicle, and the method may comprise the step of capturing sensory data of the surroundings of the automated vehicle by means of sensors of the automated vehicle. The automated vehicle may thereby transmit the information comprising the sensory data to the remote terminal. The sensory data may be visual information, sound, distance information via for instance radar or laser, temperature, speed data, motor data etc.

According to one embodiment, the method may comprise a step of rendering a representation of the surroundings of the automated vehicle based on the captured sensory data communicated from the automated vehicle to the remote terminal, and displaying the rendered representation by means of at least one remote terminal display or a remote terminal VR headset connected to the remote terminal.

According to one embodiment, said provided information to be communicated may include driving instructions for the automated vehicle, and the method may comprise a step of operating the remote terminal for providing said driving instructions for the automated vehicle. The driving instructions may thereby be communicated from the remote terminal to the automated vehicle by transmitting the sequence of N data packets.

According to one embodiment, the displayed rendered representation may present a field of view in a driving direction of the automated vehicle having a horizontal field of view that extends between 90 degrees and 360 degrees and having a vertical field of view that extends between 45 degrees and 180 degrees According to one embodiment, the method may comprise a step of driving the automated vehicle by means of the remote terminal. Information may be transmitted both from the automated vehicle to the remote terminal and vice versa in sequences of N data packets.

According to one embodiment, the displayed rendered representation may present augmented reality features for assisting a user operating the automated vehicle from the remote terminal. The augmented reality features may be based on information transmitted from the automated vehicle in one or more sequences of N data packets.

According to one embodiment, the method may comprise a step of communicating a request for further driving instructions between the automated vehicle and the remote terminal, and communicating further driving instructions between the automated vehicle and the remote terminal based on the communicated request. The request may be communicated from the automated vehicle to request assistance in a certain situation, or from the remote terminal to request a recommended measure by the automated vehicle.

According to one embodiment, the automated vehicle may be a land vehicle, such as a motor vehicle or a railed vehicle. The automated vehicle may further be a flying vehicle or floating vehicle.

According to one embodiment, the method may comprise a step of monitoring at least one automated vehicle by means of a single remote terminal, and assuming control of one of the at least one automated vehicle if said one automated vehicle is identified to require further driving assistance.

According to a second aspect of the invention, an automated vehicle may be provided, comprising communication means for communicating information to a remote terminal using a method according to any of the embodiments above.

According to a third aspect of the invention, a remote terminal may be provided, comprising communication means for communicating information to an automated vehicle using a method according to any of the embodiments above.

According to a fourth aspect of the invention, an automated vehicle control system may be provided, comprising an automated vehicle and a remote terminal according to any of the embodiments above.

BRIEF DESCRIPTION OF THE DRAWINGS

The invention will in the following be described in more detail with reference to the enclosed drawings, wherein.

DESCRIPTION OF EMBODIMENTS

Figure 1:
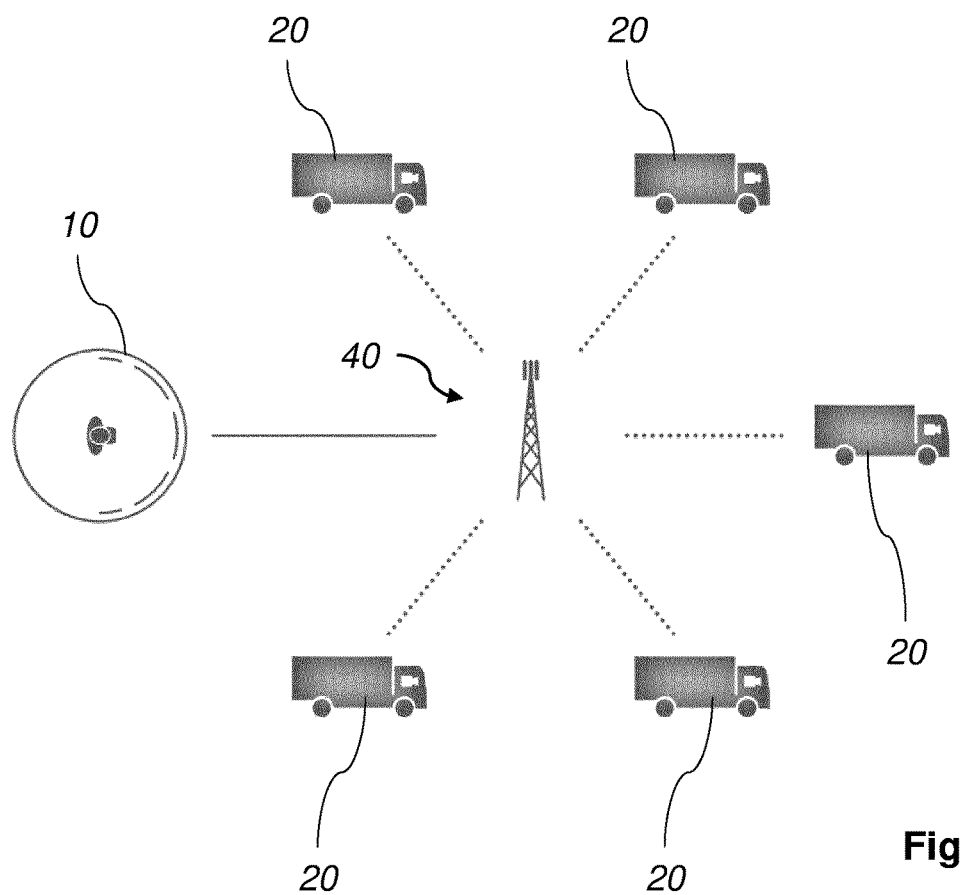
FIG. 1 shows a schematic view of a system according to an embodiment of the present invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 2:
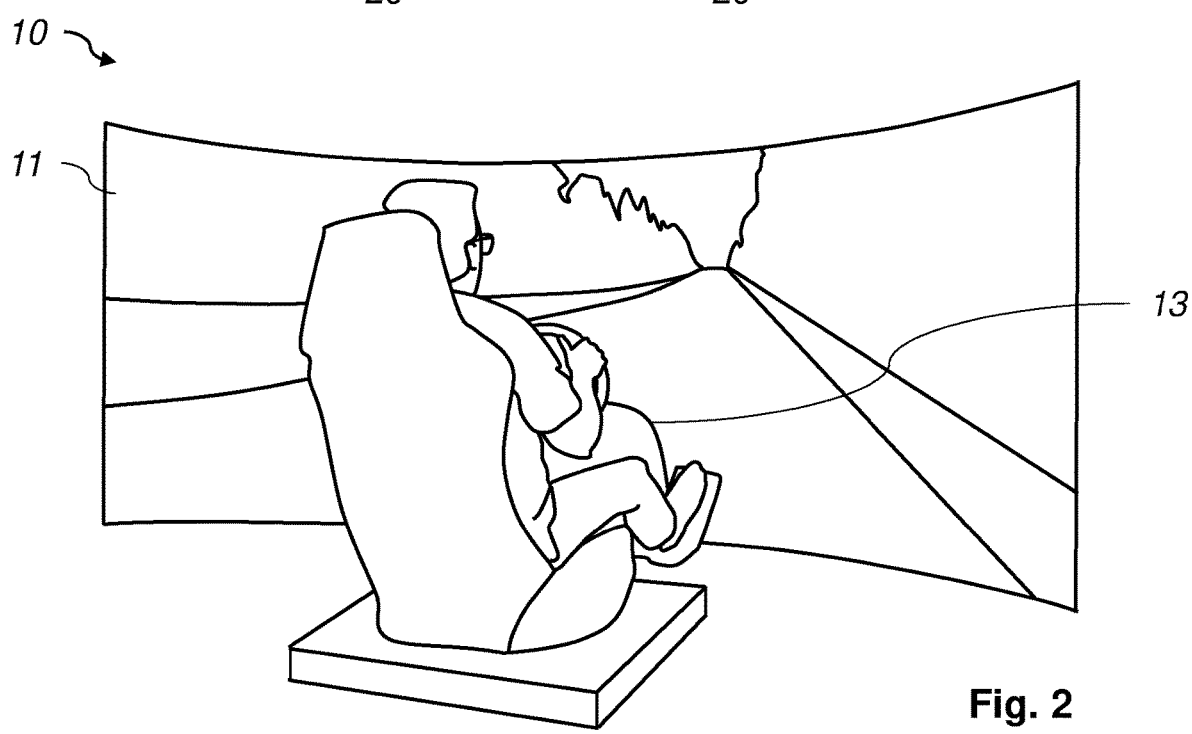
FIG. 2 shows a perspective view of a remote terminal according to an embodiment of the present invention.

FIG. 1 illustrates a system according to an embodiment of the present invention. A remote terminal 10 is communicatively connected to one or more automated vehicles 20 via a communications network 40. As seen in FIG. 2, the remote terminal 10 may comprise a display unit 11 and a control unit 13. On the display unit 11 image data received from an automated vehicle 20 is displayed. The image data can be provided by one or more cameras on the automated vehicle 20. The image data may also comprise other sensory data, or be communicated along with other sensory data, that can be displayed to the user at the remote terminal 10. The other sensory data can be presented on top of the image data on the display unit 11 to provide an augmented reality view for the user. A user using the control unit generate information to be communicated to the automated vehicle 20, such as driving instructions. The driving instructions may include steering instructions, acceleration or braking instructions and similar. When receiving the image data from the automated vehicle 20 using a communication method as in the present invention, low latency is provided such that minimal delay is achieved between the actual event at the location of the automated vehicle 20, represented for the user on the display unit 11 and to which the user may respond using the control unit 13, and when the automated vehicle 20 receives responsive driving instructions from the remote terminal 10.

As seen in FIG. 1, one remote terminal 10 can be in communication with several automated vehicles 20. The remote terminal 10 may then be used for monitoring the plurality of automated vehicles 20, and if necessary assume control of a specific automated vehicle 20.

Figure 3:
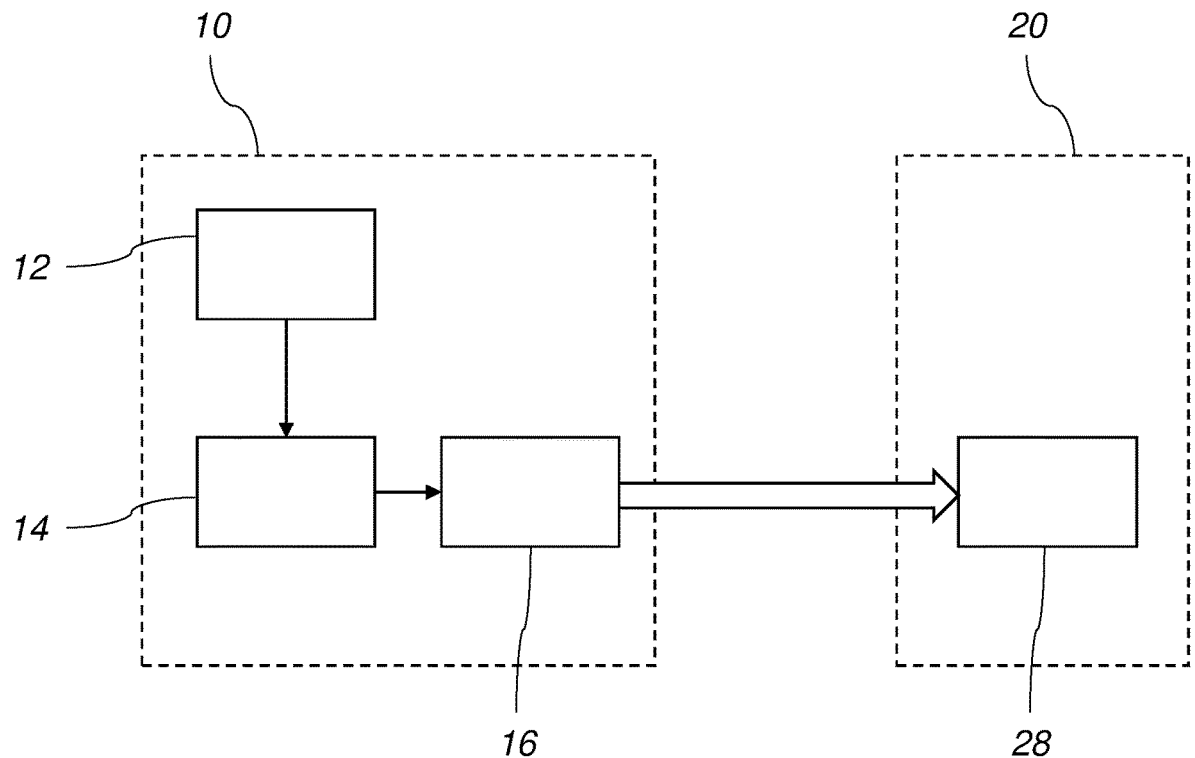
FIG. 3 shows a block diagram of a system according to an embodiment of the present invention.
Figure 4:
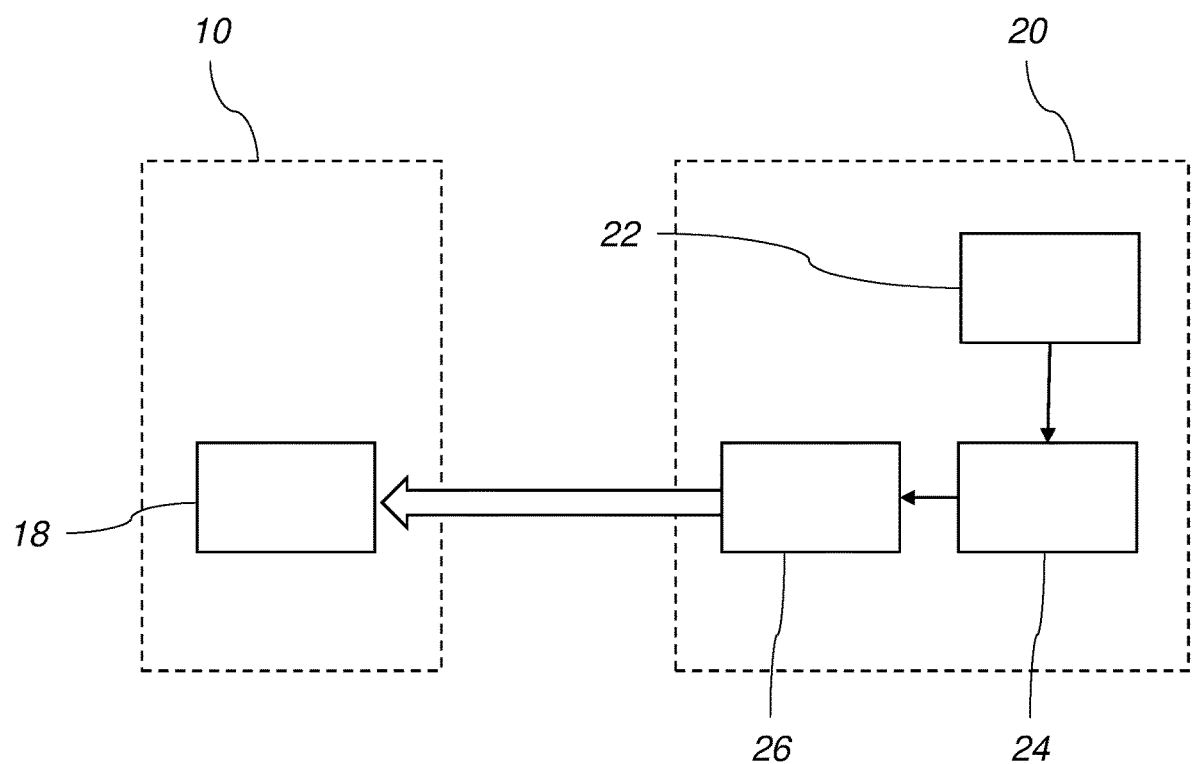
FIG. 4 shows a block diagram of a system according to an embodiment of the present invention.

FIGS. 3 and 4 illustrates embodiments of communication from the remote terminal 10 to the automated vehicle 20 (FIG. 3), and from the automated vehicle 20 to the remote terminal 10 (FIG. 4). Information 12 to be communicated is generated or received by the remote terminal 10 and provided to a packaging unit 14. The packaging unit 14 packages the information 12 into a sequence 30 of N data packets P. The sequence 30 of data packets P is then transmitted by a transmission unit 16 to the automated vehicle 20. At the automated vehicle 20, the data packets P are received and assembled by a receiving unit 28. When the automated vehicle 20 is to communicate information 22 to the remote terminal, as illustrated in FIG. 4, a packaging unit 24 receives the information 22 to be communicated. The packaging unit 24 packages the information 22 into a sequence 30 of N data packets P. The sequence 30 of data packets P is then transmitted by a transmission unit 26 to the remote terminal 10. At the remote terminal 10, the data packets P are received and assembled by a receiving unit 18.

Figure 5:
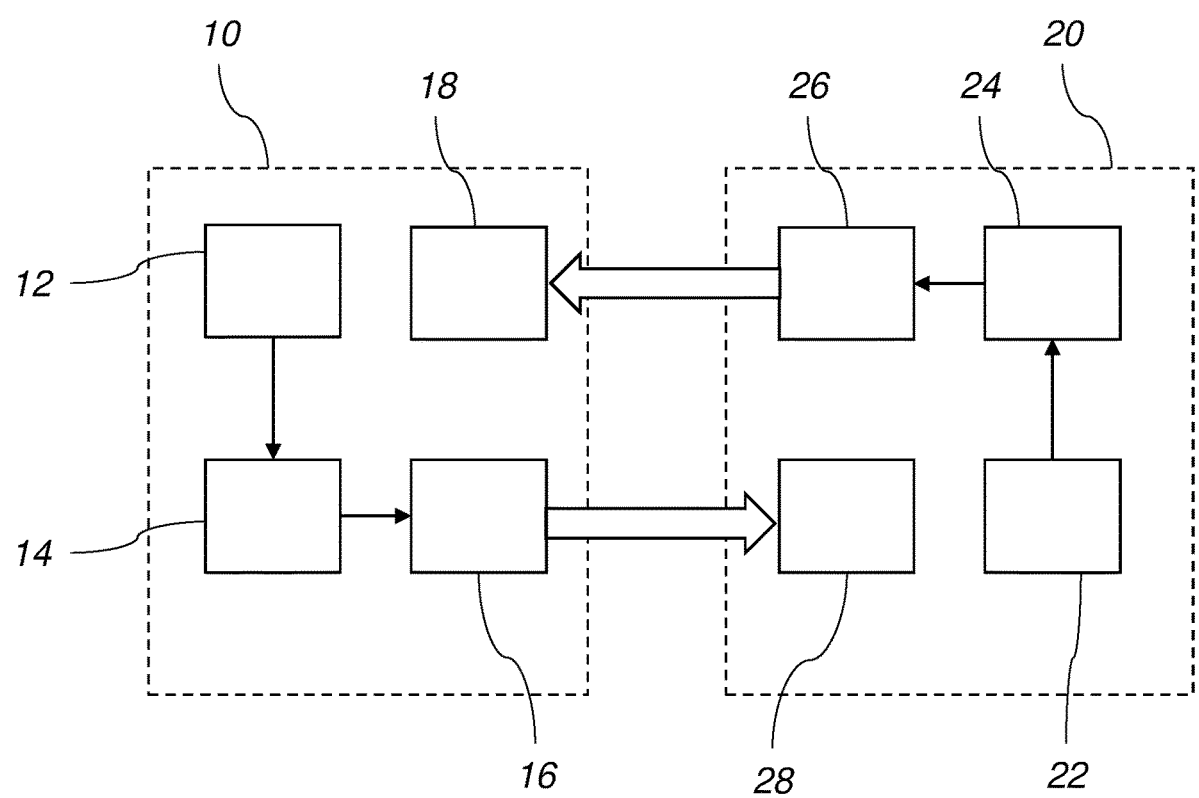
FIG. 5 shows a block diagram of a system according to an embodiment of the present invention.

FIG. 5 illustrates the embodiment wherein both the remote terminal 10 and the automated vehicle 20 communicates information 12, 22 to the other entity using the above described method and units.

The communication of the information 12, 22 is provided over one or more communications network 40, using two communication links A, B. As further illustrated in FIG. 6, the packaging unit 14 provides a sequence 30 of N data packets P to the transmission unit 16. Each data packet P is also provided with data packet number 6 that is unique for each data packet P in the sequence 30. The data packets P in the sequence 30 is thereby provided with a data packet number of 1, 2, 3, ... N, respectively. The sequence 30 of N data packets thereby comprises data packets $P_1$, $P_2$, $P_3$, ... $P_N$. When the transmission unit 16 transmits the sequence 30 of N data packets, it is sent over two communication links A, B. On a first communication link A, the sequence 30 of data packets is sent with the data packets P in an ascending order, i.e. in the order of $P_1$, $P_2$, $P_3$, ... $P_N$. On a second communication link B, the sequence 30 of data packets is sent with the data packets P in a descending order, i.e. in the order of $P_N$, ... $P_3$, $P_2$, $P_1$.

Figure 6:
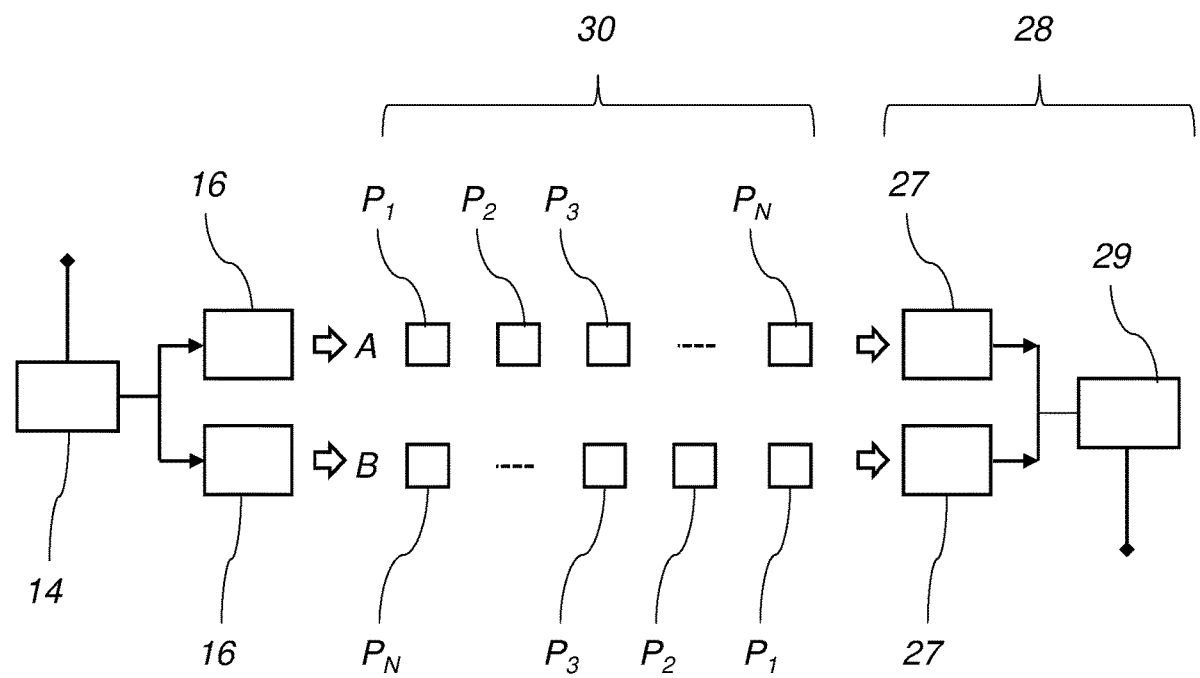
FIG. 6 shows a block diagram of a system according to an embodiment of the present invention.

In the embodiment illustrated in FIG. 6, the receiving unit 28 comprises one or more receivers 27 that receives the data packets P communicated over the first communication link A and the second communication link B. The receiving unit 28 further comprises an assembling unit 29 that assembles the received data packets P to the complete sequence 30 of data packets. The assembling unit 29 uses the data packets P that are first received on either of the communication links A, B for the assembling of the complete sequence 30. In the illustrated embodiment of FIG. 6, the assembling unit 29 would start assembling a complete sequence 30 of the communicated data packets P using the data packet $P_1$ and the data packet $P_N$, since those two are first received on the respective communication link A, B. Next, the data packets $P_2$ and $P_{N-1}$ will be received and used by the assembling unit 29. Consequently, only about half of the sequence 30 of data packets P would need to have been received by the receiving unit 28 before the assembling unit 29 can have assembled the complete sequence 30 of data packets P. The embodiment illustrated in FIG. 6 applies equally in the situation when the automated vehicle 20 is to communicate information 22 to the remote terminal 10. The transmission unit 26 of the automated vehicle 20 will then transmit the sequence 30 of data packets P over two communication links A, B, and the receiving unit 18 of the remote terminal would receive and assemble the received data packets P correspondingly.

Figure 7:
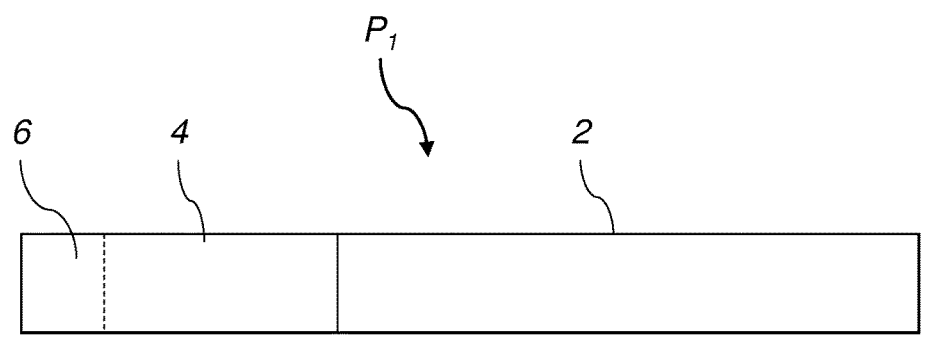
FIG. 7 shows a data packet according to an embodiment of the present invention.

FIG. 7 illustrates a data packet $P_1$ that comprises a header 4 and a data payload 2. The data payload 2 is received by the packaging unit 14, 24 as part of the information 12, 22 to be communicated. The packaging unit 14, 24 provides the data payload 2 with a header 4, forming the data packet P. As part of the header 4, the data packet P is provided with the data packet number 6. In the sequence 30 of data packets P, each data packet P is given a unique data packet number 6. If a sequence of ten data packets is formed by the packaging unit 14, 24, the data packets forming the sequence are given the data packet numbers 1 to 10 respectively. In some embodiments, the header 4 comprises further fields. For instance, the header 4 may be defined using a protocol, and the header may comprise a protocol identification field.

Figure 8:
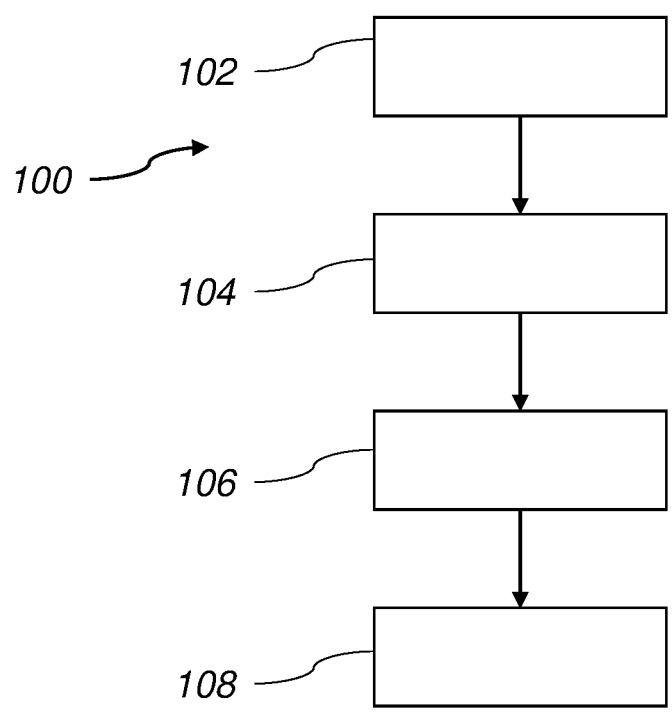
FIG. 8 shows a flow chart of a method according to an embodiment of the present invention.

FIG. 8 illustrates a method 100 for communicating information between an automated vehicle 20 and a remote terminal 10 according to an embodiment of the present invention. The method 100 may be computer-implemented and comprises a step 102 of providing information to be communicated. The information 12, 22 may be received by the one of the automated vehicle 20 and the remote terminal 10 that is to communicate the information 12, 22, or it can be generated by the same entity. The information 12, 22 to be communicated is packaged 104 by means of the packaging unit 14, 24 to the sequence 30 of N data packets P. In the step of packaging 104, each data packet P is provided with a unique data packet number 6 ranging from 1 to N. The data packet number 6 indicates the respective data packet's position in the sequence 30 of data packets P.

When the sequence 30 of N data packets P has been formed by the packaging unit 14, 24, the sequence 30 is transmitted 106 via at least two communication links A, B. The transmission 106 is made by means of a transmission unit 16, 26. The transmission unit 16, 26 transmits the sequence 30 of N data packets, each having a unique data packet number 6, over two communication links A, B. Over the first communication link A, the transmission unit 16, 26 transmits the sequence 30 in an order of ascending data packet numbers 6. Over the second communication link B, the transmission unit 16, 26 transmits the sequence 30 in an order of descending data packet numbers 6.

Finally, the receiving entity out of the automated vehicle 20 and the remote terminal 10 assembles 108 a complete sequence 30 of the unique data packets after each unique data packet P has been successfully communicated via either the first or the second communication link A, B.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A computer-implemented method for communicating information between an automated vehicle and a remote terminal, comprising the steps of:
providing information to be communicated between the automated vehicle and the remote terminal;
packaging said information using a packaging unit as a sequence of N data packets, wherein each of the N data packets is provided with a unique data packet number ranging from 1 to N indicating the position of each data packet in the sequence of the N data packets;

transmitting the sequence of N data packets via a first communication link between the automated vehicle and the remote terminal and also via at least a second communication link between the automated vehicle and the remote terminal, said first and at least second communication link established over a communications network between an automated vehicle communication unit and a remote terminal communication unit;

receiving the transmitted N unique data packets at a receiving unit; and assembling a complete sequence of the transmitted N unique data packets using an assembling unit associated with the receiving unit after each of the N unique data packets has been successfully communicated via said at least first and/or second communication link, wherein the sequence of N data packets is transmitted via said first communication link in an order of ascending data packet numbers and via said at least second communication link in an order of descending data packet numbers.

2. The method according to claim 1, wherein the unique data packet number is provided in a header of the data packet.

3. The method according to claim 2, wherein the step of packaging the information in a sequence of N data packets comprises a step of using a protocol defining a data payload, and wherein the header further comprises any combination of the following fields: protocol identifier, frame index, frame buffer, and buffer offset.

4. The method according to claim 1, wherein at least one of the first and second communications link is a wireless communication link is established over the communications network, and wherein the communications network comprises a cellular network, such as 4G/LTE or 5G.

5. The method according to claim 1, wherein said provided information to be communicated includes sensory data of surroundings of the automated vehicle, and the step of providing information to be communicated comprises a step of capturing sensory data of the surroundings of the automated vehicle using sensors of the automated vehicle.

6. The method according to claim 5, further comprising a step of rendering a representation of the surroundings of the automated vehicle based on the captured sensory data communicated from the automated vehicle to the remote terminal, and displaying the rendered representation using at least one remote terminal display or a remote terminal VR headset.

7. The method according to claim 6, wherein the displayed rendered representation presents a field of view in a driving direction of the automated vehicle having a horizontal field of view that extends between 90 degrees and 360 degrees and having a vertical field of view that extends between 45 degrees and 180 degrees.

8. The method according to claim 6, wherein the displayed rendered representation presents augmented reality features for assisting a user operating the automated vehicle from the remote terminal.

9. The method according to claim 1, wherein said provided information to be communicated includes driving instructions for the automated vehicle, and the step of providing information to be communicated comprises a step of operating the remote terminal for providing said driving instructions for the automated vehicle.

10. The method according to claim 9, further comprising a step of driving the automated vehicle using the remote terminal.

11. The method according to claim 9, further comprising the steps of
communicating a request for further driving instructions between the automated vehicle and the remote terminal, and
communicating the further driving instructions between the automated vehicle and the remote terminal based on the communicated request.

12. The method according to claim 1, further comprising the step of monitoring at least one automated vehicle using a single remote terminal, and assuming control of one of the at least one automated vehicle if said one automated vehicle is identified to require further driving assistance.

13. The method according to claim 1, wherein the remote terminal is configured to communicate with several automated vehicles.

14. An automated vehicle configured to communicate with the remote terminal using the method according to claim 1.

15. A remote terminal configured to communicate with the automated vehicle using the method according to claim 1.

16. An automated vehicle control system comprising the communications network, wherein the remote terminal is configured to communicate information between the remote terminal and an automated vehicle, and wherein the automated vehicle control system is configured to communicate information in either direction between the automated vehicle and the remote terminal according to the method of claim 1.

* * * * *